Figure 1:
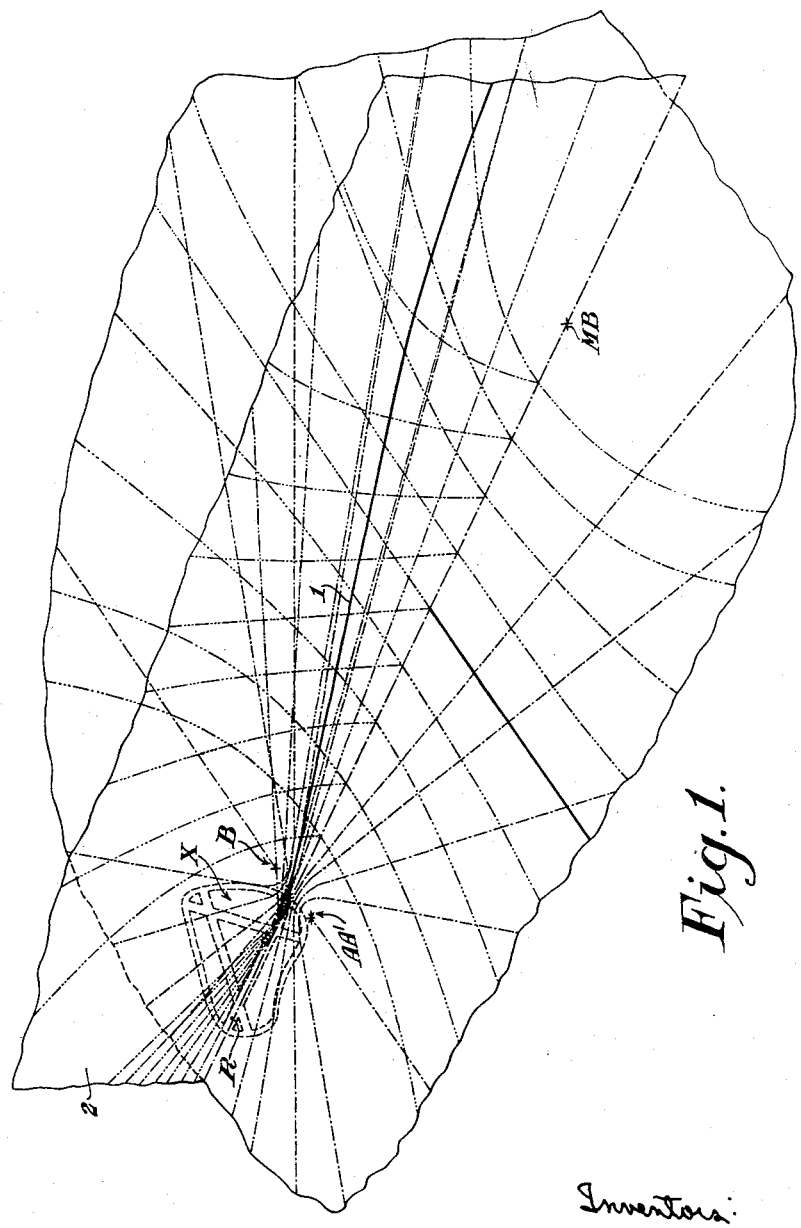

May 29, 1956  N. M. RUST ET AL  2,748,385
RADIO NAVIGATION AIDS FOR AIRCRAFT
Filed March 12, 1951  2 Sheets-Sheet 1

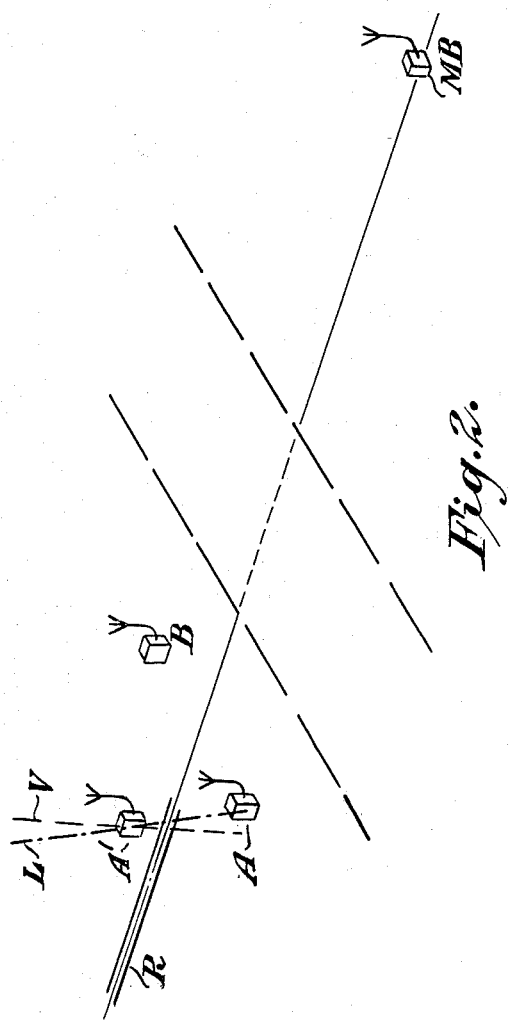

United States Patent Office 2,748,385
Patented May 29, 1956

2,748,385
RADIO NAVIGATION AIDS FOR AIRCRAFT

Noel Meyer Rust, Danbury Common, and Christopher Sydney Cockerell, Danbury, England, assignors to Marconi's Wireless Telegraph Company Limited, London, England, a company of Great Britain Application March 12, 1951, Serial No. 215,092
Claims priority, application Great Britain March 15, 1950
7 Claims. (Cl. 343—108)

This invention relates to radio navigation aids for aircraft and has for its object to provide improved navigation aids for assisting aircraft in to land at an airfield.

The practical requirements for a good radio aircraft landing aid are very difficult to satisfy without great complication of apparatus or, indeed, at all. The requirements involve that the landing aid shall define an airfield approach lane, i. e. a vertical plane in which the aircraft should remain when flying in, and a predetermined glide path in that lane, i. e. a path which the aircraft should follow in actual landing. One of the great difficulties is that the glide path should, ideally, not be a straight inclined line but should be asymptotic, or approximately so, to the airfield surface. This requirement is particularly difficult to satisfy and, in practice, is generally regarded as an unattainable ideal. It is also very desirable that the aerials providing the signals of the landing aid shall be well clear of the line of the approach and glide path so that they do not constitute obstructions, or near obstructions to landing aircraft. A further practical requirement which is very difficult to satisfy is that of avoiding navigation aid errors due to varying interferences by radio reflecting bodies e. g. metal hangars, in the neighborhood of the airfield.

The present invention seeks to provide a relatively simple navigation aid whereby the foregoing requirements may be satisfied to a high degree.

According to this invention a radio navigation aiding system for guiding aircraft in to land comprises a radio installation adapted to provide a space pattern of hyperbolic surfaces with foci on a substantially horizontal line substantially at right angles to the desired approach plane and an installation adapted to provide a second space pattern of hyperbolic surfaces with foci situated to one side of the approach plane and disposed on a line which slightly falls away from the vertical in a plane parallel to said approach plane and in the direction of flight of aircraft, the whole arrangement being such that the intersection of one of the latter hyperbolic surfaces with one of the former defines the desired glide path in the desired approach plane.

There are, of course, numerous known radio systems which will define a space pattern of hyperbolic surfaces and any such systems may be employed in carrying out this invention. It is however, preferred to use systems in which continuous wave transmission is used and each surface is that in which a particular phase relation between the signals from geographically spaced points occur. Such systems will be herein termed phase angle hyperbolic systems and there are, of course, numerous known phase angle hyperbolic systems. Thus, two vertical aerials, with tied or synchronised continuous wave transmissions, constitute a phase angle hyperbolic system. If they both transmit the same frequency in synchronism then any receiver in a vertical plane at right angles to the line joining the two aerials would receive the signals from both in the same phase. If the receiver were nearer one than the other, then there would be a particular characteristic phase angle other than zero between the two signals as received. This phase angle would be obtained anywhere on a particular hyperbola in a horizontal plane passing through the two aerials and also anywhere on a hyperbolic surface (in space) of which said hyperbola was the intercept in said horizontal plane. Of course, the phase angle hyperbolic system just described is not practical because the receiver would not be able to distinguish between the two signals of the same frequency to measure the phase angle between them but the description is given merely to assist, by example, in making clear what is meant by "phase angle hyperbolic systems." There are a number of known, practical, phase angle hyperbolic systems operating on the principle described. In the system described, of course, the two aerials are provided at the two foci of the space pattern of hyperbolic surfaces.

Preferably an additional radio installation, also adapted to provide a space pattern of hyperbolic surfaces, but with foci in a horizontal or approximately horizontal line in, or near and approximately parallel to the plane approach, is provided in order to give the pilot of an aircraft information as to his progress along the approach plane. This installation may be of the same type as the others.

The invention is illustrated in the accompanying drawings which diagrammatically illustrates one embodiment, Fig. 1 being directed to the space patterns, and Fig. 2 to the disposition of the installations.

Referring to the drawing X designates an airfield, the runways of which are indicated in dotted lines, and one runway of which is indicated at R. The figure illustrates the invention as applied to facilitate the landing of aircraft in one direction (to the left and upwards in the figure) on this runway R. It is to be understood that further installations like that now to be described may be provided to facilitate landing in either direction on any runway but such additional installations are not indicated to avoid further complicating the figure.

Referring to the drawing two vertical aerials are provided at AA' and B at the ends of a line which is at right angles to the desired glide path and is bisected by said path which is shown in full lines at 1 and is in the same vertical plane as the runway R. These aerials, which are to the sides of the landing runway R are energized with continuous waves in such manner as to cause them to constitute a phase angle hyperbolic system. They will accordingly provide a pattern of hyperbolic surfaces in space, each being characterized by a particular phase relationship of the signals received by a receiver from the two aerials. This pattern is represented in chain lines consisting of dashes and single dots. Of these surfaces that which bisects the line AA'—B between the aerials which are at the foci of the space pattern, will be a vertical plane which is marked 2 and contains the glide path 1. Departure from the plane 2 will be indicated in an aircraft by a departure from the phase relationship which characterizes that plane. Such departure may be most conveniently indicated by a phase meter in the plane and arranged to read port and starboard to indicate the course corrections required to return to the plane 2. It is not thought necessary to describe the aircraft receiver apparatus, nor the transmitter apparatus, in detail since this does not form any part of the present invention. Suffice it to say here that the two vertical aerials at AA' and B transmit different frequencies in accurately tied time relationship and that the aircraft receiver receives these frequencies, derives therefrom two signals at a common frequency, and compares the phase of the derived common frequency signals.

In addition to the pair of aerials above referred to, there is a second pair both situated to one side of the landing runway. In Fig. 1 the second pair are at the point AA' and are mounted over one another though, as shown in Fig. 2, not vertically over one another. The aerials of the second pair are also energized with continuous waves to cause them to constitute a second phase angle hyperbolic system giving a second pattern of hyperbolic surfaces in space. The second pattern is indicated in Fig. 1, by chain lines with double dots. Of course, the frequencies used for the second pair of aerials are different from those used for the first to enable a cooperating receiver to distinguish between them. It will be obvious that, owing to the approximately vertical relation of the aerials of the second pair the hyperbolic pattern produced thereby will be approximately at right angles to that produced by the first and the middle hyperbolic surface, i. e. that which passes through the middle point of the line joining the foci and which is, of course, a plane, will be approximately horizontal instead of vertical. The extent and direction of departure of this plane from the strictly horizontal will depend upon the extent and direction of departure of the line L, Fig. 2, joining the aerials from the vertical V, Fig. 2, i. e., upon the tilt of the said line. It will also be seen that hyperbolic surfaces due to the second pair of aerials will intersect the vertical plane 2 produced by the first system in hyperbolae. By suitably selecting the tilt of the focal line L of the second system the result may be achieved that the hyperbola of intersection of a particular chosen hyperbolic surface of the second system with the approach plane of the first system is a smoothly curved line, asymptotic to the runway surface at a desired distance along it, and approximating very closely indeed to an ideal glide path. In general, the aerials of the second pair will be to one side of the landing runway at or near the upwind end thereof, and for this case, the tilt is made such that the higher A' of the two aerials of the second pair is nearer the runway and upwind of the lower. The component of tilt towards the runway is chosen to bring the intersection of the planar hyperbolic surface of the second system with the approach plane (this intersection is, of course, a straight line) below ground level and the component of tilt in the upwind direction is chosen to give the said intersection a downward gradient in the upwind direction so that hyperbolic intersections above this intersection—and one of these hyperbolic intersections is chosen to define the glide path 1—curve down towards the ground over the operative part i. e. the part over the runway and in the approach direction. As in the case of the first system a co-operating aircraft receives the two signals from the aerials of the second system, derives common frequency signals therefrom and compares the phase of the derived signals in a phase clock or phase indicator instrument which, in this case, will indicate too high or too low. The hyperbolic intersection which is chosen to define the glide path is, of course, characterized by a particular chosen phase relationship between the derived signals. Accordingly an aircraft flying to maintain the predetermined phase relationship between the signals from the aerials of the first system and also the predetermined phase relationship between the signals from the aerials of the second system, will fly along the predetermined glide 1 path in the approach plane 2.

Preferably a third phase angle hyperbolic system is provided operating on further distinguishable frequencies. The aerials of this system are in an approximately horizontal line, in or near and parallel to the approach plane and situated downwind of the runway. As indicated they are at B and MB. These also are operated on distinguishable frequencies, to provide a pattern of hyperbolic surfaces in space. These surfaces are indicated by chain lines with treble dots. It will be seen that an aircraft, flying in along the chosen glide path 1 in the plane 2, and receiving the signals from the aerials of the third pair, will observe the phase relation between these signals to change and accordingly a phase meter or clock responsive to this changing phase relation will indicate in the aircraft its momentary position along the glide path.

For the sake of simplifying explanation, the foregoing description has been given with the implicit assumption that there is only one runway which is always used in the same direction. This, of course, is not the case in practice and the systems described may be repeated as necessary in dependence upon the number of runways and, in general, the number of different landing conditions which have to be catered for in the airfield considered.

Again, in the preceding description, each pair of aerials has been considered separately. In practice, however, two or more of the aerial systems may, if desired, have common aerials e. g. the first and second pairs (the approach plane and glide path pairs) might be constituted by three aerials of which one (the lower of the second pair) was common to both.

Other radio navigation aids as known per se, e. g. so-called marker beacons to assist in "orbiting" an airfield while waiting to land, or positioned at intervals in the approach line, may be provided if desired.

It will be noted that the particularly described systems do not depend for their operation upon comparisons of received field strengths. They are, therefore, to a much higher degree immune from deleterious interference by "false" or reflected signals—e. g. reflections from hangars or the like—than are systems which involve such field strength comparisons. Moreover the aerials employed and the mast structures therefor can be situated well clear of the runways which they serve so that obstruction is at a minimum. Indeed, in the particular system described, the only aerials in or near the approach plane are those of the third system and these, being downwind of the runway, do not constitute obstructions since aircraft at their position will be at a considerable height over the ground.

The invention is not limited to continuous wave systems—though these are much preferred—but may theoretically at any rate, use any hyperbolic systems as known per se.

An important practical advantage of the invention is the wide freedom of choice it gives to the designer of an airfield navigation aiding system as to the glide paths indicated thereby. At present the general view (the correctness of which may, however, be doubted) of an ideal glide path navigation aid is that it should provide a line in space starting at about 10 miles out and ending at the touch-down point, this line being straight and inclining downwards at about 2½ degrees over most of its length with the last few hundred yards curved and asymptotic to the runway. In practice other aids, or general navigation procedure, enable the pilot to pass over an outer marker at the correct height to intercept the glide path and with fairly accurate knowledge of the correct heading and of his position in azimuth. He then heads into the glide path and follows it down, passing en route over an intermediate marker which informs him of his progress. He proceeds thus until a so-called "critical height" is indicated by his altimeter, this being a height at which he can still climb and go round again, if he chooses, to make a second attempt at landing. On reaching the critical height, the aircraft will be nosed downwards with flaps and landing wheels down, travelling at low speed and with reduced maneuverability. The critical height of course, varies with the type of aircraft, the airfield and other operating conditions. On reaching this height the pilot has to decide whether to land or go round again, the decision depending on visibility and whether he has approached correctly. If conditions are satisfactory the pilot has virtually no action to take (if the aircraft is under the control of an automatic pilot controlled by the signals of the glide path radio aid he has no action at all to take) and merely proceeds to touch down; if, however, they are not he has to take drastic and rapid action. Obviously the present invention can be used to provide a glide path which will fit in very closely with the foregoing procedure but it may be doubted whether, in fact, such a procedure is by any means ideal for, at the time that the decision not to land must be taken (if at all) the aircraft is in bad flying conditions for acting on it. As, with improvement in radio aids and tolerances, the critical heights tend to become lower, this consideration tends to become more and more important and it may well be that the ideal glide path is not one that terminates asymptotically at the runway but rather one that leads the aircraft down to the critical height, levels it at that height and then sets it into a gradual climb (automatically if a radio controlled automatic pilot is used) so that, on reaching the critical height the human pilot can take over and land if his visibility is such that he sees it to be safe to do so. If, however, he does not see "landing safety" at the critical height he has no action to take and the aircraft will fly up again. The present invention can be applied to comply with this procedure which is believed to be the better. To effect such compliance the radio installation would be set up to provide a family of hyperbolic glide paths which become horizontal (prior to proceeding upwards again) at different heights—and, of course, in the desired correct position along the runway—so that the pilot could choose the glide path of desired "horizontal" i. e. critical height of, say, 200 feet or 50 feet or whatever the chosen height might be and proceed down that path knowing that he will always have a clearance which is never less than that height so that, even if the visibility is so bad as not to give him visual contact with the ground, or if he has not approached with sufficient accuracy to obtain such visual contact, he will be safely flown off without action on his part. Of course, upon obtaining satisfactory visual contact he takes charge and lands.

We claim:

1. A radio navigation aiding system for guiding aircraft in to land along the runway along a desired glide path in a desired approach plane, comprising a first radio installation of the type providing a space pattern of hyperbolic surfaces, said installation comprising at least one pair of electrically tied aerials, the aerials of any one pair being situated on different sides of said approach plane so that said installation has foci on a substantially horizontal line substantially at right angles to the desired approach plane, and a second installation also of the type providing a space pattern of hyperbolic surfaces, said second installation comprising at least one pair of electrically tied aerials, the aerials of any one pair being spaced vertically and situated to one side of said approach plane so that said second installation has foci situated to one side of said approach plane and disposed on a line which slightly falls away from the vertical in a plane parallel to said approach plane and in the direction of flight of said aircraft, the aerials of said installations being also so positioned that the intersection of a predetermined one of the hyperbolic surfaces of one installation with a predetermined one of the hyperbolic surfaces of the other, defines the desired glide path in the desired approach plane.

2. A radio navigation aiding system for guiding aircraft in a desired approach plane as set forth in claim 1 including a third radio installation also of the type providing a space pattern of hyperbolic surfaces, said installation comprising at least one pair of electrically tied aerials, the aerials of any one pair being spaced horizontally and situated on a line substantially parallel to said approach plane so that said third installation has its foci in an approximately horizontal line, having approximately the same line of direction as the said plane of approach.

3. A radio navigation aiding system for guiding aircraft in a desired approach plane as set forth in claim 1 including a third radio installation also of the continuous-wave phase-angle hyperbolic type providing a space pattern of hyperbolic surfaces, said installation comprising at least one pair of electrically tied aerials, the aerials of any one pair being spaced horizontally and situated on a line substantially parallel to said approach plane so that said third installation has its foci in an approximately horizontal line, having approximately the same line of direction as the said plane of approach.

4. A radio navigation aiding system to guiding aircraft in a desired approach plane as set forth in claim 1 including a third radio installation also of the continuous-wave phase-angle hyperbolic type providing a space pattern of hyperbolic surfaces, said installation comprising at least one pair of electrically tied aerials, the aerials of any one pair being spaced horizontally and situated on a line substantially parallel to said approach plane so that said third installation has its foci in an approximately horizontal line, having approximately the same line of direction as the said plane of approach, said third installation comprising a pair of electrically tied aerials situated in an approximately horizontal line approximately parallel to the approach plane and situated before the landing end of the runway.

5. A radio navigation aiding system for guiding aircraft in to land along the runway along a desired glide path in a desired approach plane, comprising a first radio installation of the continuous-wave phase-angle hyperbolic type providing a space pattern of hyperbolic surfaces, said installation comprising at least one pair of electrically tied aerials, the aerials of any one pair being situated on different sides of said approach plane so that said installation has foci on a substantially horizontal line substantially at right angles to the desired approach plane, and a second installation also of the continuous-wave phase-angle hyperbolic type providing a space pattern of hyperbolic surfaces, said second installation comprising at least one pair of electrically tied aerials the aerials of any one pair being spaced vertically and situated to one side of said approach plane so that said second installation has foci situated to one side of said approach plane and disposed on a line which slightly falls away from the vertical in a plane parallel to said approach plane and in the direction of flight of said aircraft, the aerials of said installations being also so positioned that the intersection of a predetermined one of the hyperbolic surfaces of one installation with a predetermined one of the hyperbolic surfaces of the other, defines the desired guide path in the desired approach plane.

6. A radio navigation aiding system guiding aircraft in to land on a runway along a desired glide path in a desired approach plane as set forth in claim 5 wherein the first installation comprises a pair of electrically connected aerials situated on a line at right angles to the approach plane and equally spaced on opposite sides thereof, and the second installation comprises a pair of electrically connected aerials situated one above the other on a plane near the vertical and situated to one side of said approach plane.

7. A radio navigation aiding system for guiding aircraft in to land on a runway along a desired glide path in a desired approach plane as set forth in claim 5 wherein the first installation comprises a pair of electrically connected aerials situated on a line at right angles to the approach plane and equally spaced on opposite sides thereof, and the second installation comprises a pair of electrically tied aerials situated one above the other on a line near the vertical and situated to one side of said approach plane, one aerial of one pair being common to both pairs.

References Cited in the file of this patent

UNITED STATES PATENTS

| | | |
|---|---|---|
| 1,562,485 | Affel | Nov. 24, 1925 |
| 2,144,203 | Shanklin | Jan. 17, 1939 |
| 2,148,267 | Honore | Feb. 21, 1939 |
| 2,198,113 | Holmes | Apr. 23, 1940 |
| 2,439,663 | Lewis | Apr. 13, 1948 |
| 2,513,320 | Hawkins | July 4, 1950 |